June 14, 1938.  W. E. WOOD  2,120,320
METHOD OF MAKING FINGER RINGS AND BLANK THEREFOR
Filed June 24, 1936  2 Sheets-Sheet 1
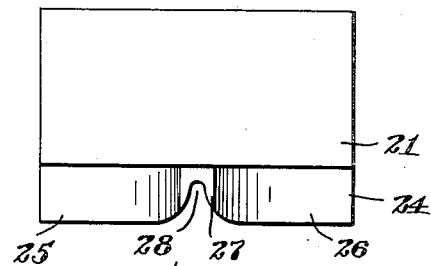
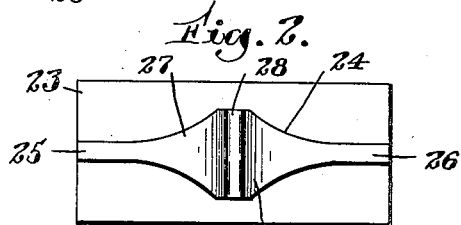
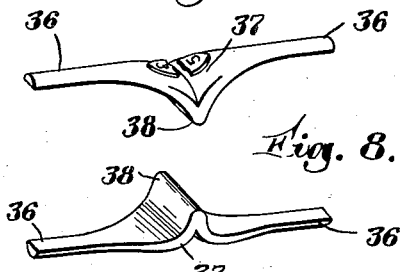
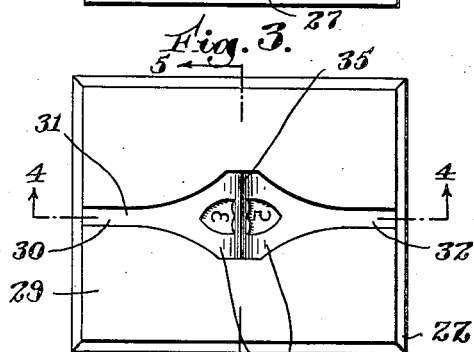
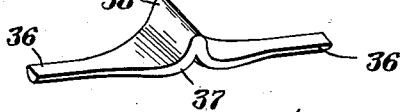
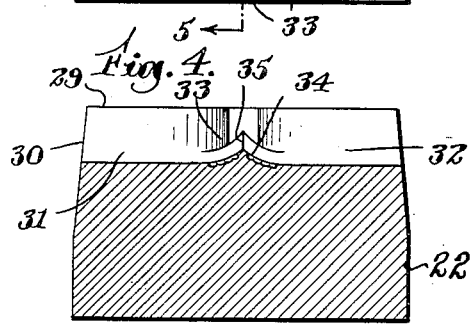
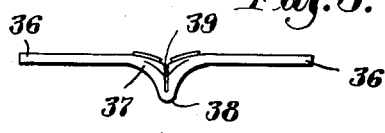
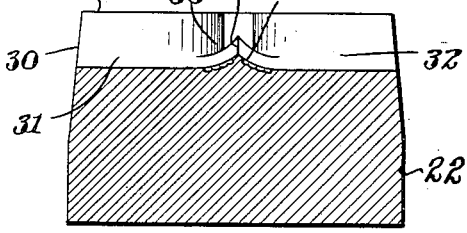
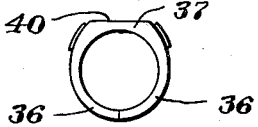
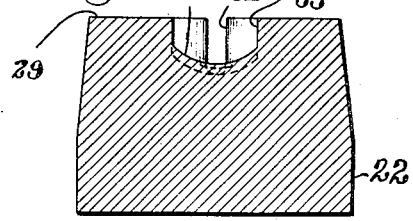
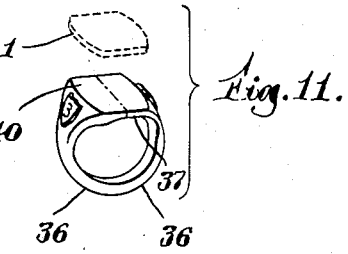
Inventor
WILLIAM E. WOOD
by Geo. B. Rawlings.
Attorney June 14, 1938. W. E. WOOD 2,120,320
METHOD OF MAKING FINGER RINGS AND BLANK THEREFOR
Filed June 24, 1936 2 Sheets-Sheet 2

Inventor
WILLIAM E. WOOD
by Geo B Rawlings
Attorney

Patented June 14, 1938

2,120,320

UNITED STATES PATENT OFFICE 2,120,320

METHOD OF MAKING FINGER RINGS AND BLANK THEREFOR

William E. Wood, Islington, Mass.

Application June 24, 1936, Serial No. 86,958

7 Claims. (Cl. 29—160.6)

This invention relates to methods of making finger rings, and contemplates certain improvements whereby manufacturing costs are greatly simplified and loss of expensive material avoided.

Although not restricted thereto, my invention is especially applicable to the manufacture of signet rings where on account of the various manufacturing steps heretofore considered essential in all previous methods of manufacture with which I am familiar, manufacturing costs have been high and loss or wastage of material excessive.

As illustrative of the principles involved, I describe and show in the accompanying specification and drawings the manner of practicing my invention, together with different types of rings made in accordance therewith.

In the drawings:—

Fig. 1 is a side view of the type of the forcer used to produce the signet ring shown in Figs. 10 and 11.

Fig. 2 is a bottom view of Fig. 1

Fig. 3 is a top plan view of the die used with either the forcer of Figs. 1 and 2 or the forcer of Figs. 12 and 13.

Figs. 4 and 5 are cross-sections on the lines 4—4 and 5—5, respectively, of Fig. 3.

Figure 19:

Fig. 6 is a detail view of the taper blank, generally used in producing the ring of Figs. 10 and 11, it being understood, however, that such blank may be flat as in Fig. 19, or cylindrical, or oval, and with or without tapered ends.

Fig. 7 is a top perspective view of the blank of Fig. 6 after pressing between the forcer and die, and before sawing as in Fig. 9.

Fig. 8 is a bottom perspective view of Fig. 7.

Fig. 9 is an edge view of the blank of Figs. 7 and 8 after it has been sawed transversely to a depth sufficient to give a signet of the area wanted when the ends are bent towards each other and soldered together as in Figs. 10 and 11.

Fig. 10 shows the ring so bent and soldered.

Fig. 11 shows the signet base about to be applied to the signet.

Figure 12:
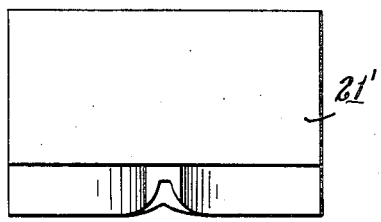
Figure 17:
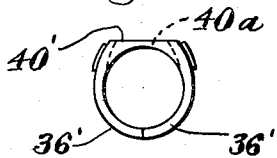
Figure 13:
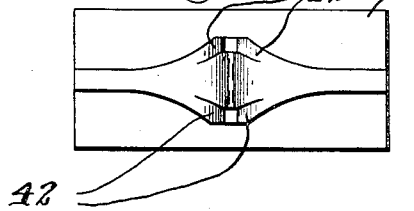
Figure 18:
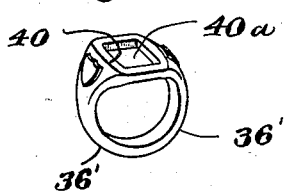

Figs. 12 and 13 are respectively side and bottom views of a slightly different forcer adapted to be used with the die of Figs. 3, 4 and 5 in making the cut-out back type of ring shown in Figs. 17 and 18.

Figure 14:
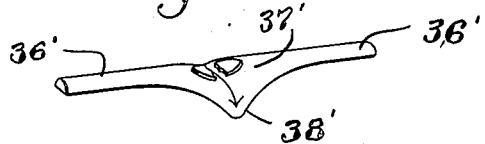

Fig. 14 is a perspective view, as seen from above, of the blank after pressing between the forcer of Figs. 12 and 13 and the die of Figs. 3, 4 and 5.

Figure 15:
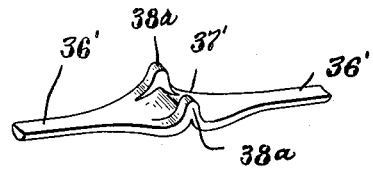

Fig. 15 is a similar view as seen from below of the blank of Fig. 14.

Figure 16:
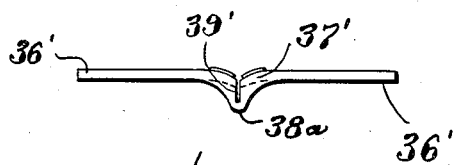

Fig. 16 is an edge view of the blank of Figs. 14 and 15 after it has been sawed transversely. (See also Fig. 20 which is a top perspective thereof.)

Figure 20:

Fig. 17 is an edge view of the sawed blank of Figs. 16 and 20 after it has been bent to ring form and its ends soldered together.

Fig. 18 is a perspective view of Fig. 17, particularly showing the cut-out signet.

Fig. 19 is a perspective view of a flat blank from which the ring with cut-out back shown in Figs. 17 and 18 may be made, it being understood however that the taper blank of Fig. 6 or cylindrical or oval blanks, with or without tapered ends, may be used under some conditions to produce a cut-out back.

Fig. 20 is a perspective view of the sawed blank of Fig. 16, and

Figure 21:
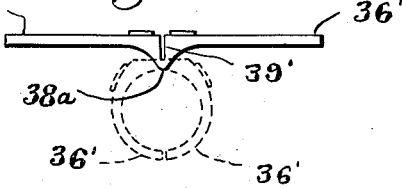

Fig. 21 is a diagram illustrating the underlying principle of my method.

Considering the signet type of ring as typical, there are several manufacturing methods now in use. One method is to stamp half-rings and solder them together. Another method is to stamp a flat blank with a concave signet which when rounded up theoretically becomes flat but which in practice is frequently distorted as are the ornaments on the sides of the ring. Still another method is the so-called "camel back" method which gives a flat signet but no depth to the side ornaments.

Each method has disadvantages peculiar to itself. The half-ring method gives an unbalanced die and twice the work of striking up. The flat method distorts the side ornaments when rounded up and the signets do not always come out the right size. The "camel back" method gives little or no chance for side ornaments of any depth, and is moreover unsuited for many designs.

My method avoids the disadvantages of existing methods while at the same time possessing certain advantages not possible with the methods now in use.

One advantage of my method is the saving in manufacturing costs.

Another advantage is its adaptability to the production of rings of different construction and weights, from the same die. The value of this will be appreciated when it is remembered that a ring maker frequently receives an order for an assorted lot of rings of similar design. Part of the order may be for rings of full solid gold, another part for rings of solid gold with cut-out back, and still another part for rings of solid gold with forced out back. Or the order may be for gold shell, or part of it for solid gold and part for gold shell.

With my method, it is only necessary to change the forcers to complete the most assorted order in either solid gold or gold shell. These forcers are standard and can be used with other dies of the same size though of different designs.

Another advantage of my method is that it eliminates trimming or waste, as well as reduces polishing and the waste incident thereto to the minimum.

Other advantages of my method are that the die cutter can cut any number of different sizes of the same ring design by machine, instead of having a separate model for each different size; that the signets can be controlled as to area and location so as always to be of the right size and rightly located with reference to the sides of the ring; and that distortion of the work is avoided when the blank is bent to ring shape.

Referring first to Figs. 1 to 11 inclusive wherein I illustrate a method of making a heavy signet ring of the uncut-out back type, I have indicated generally at 21 a forcer and at 22 a coacting die.

The forcer 21 (Figs. 1 and 2) is a block having its under face 23 formed as a forcing surface 24 of a length and width to form a finished ring of the desired size.

The forcing surface 24 extends downwardly below the plane of the under face 23 of the block an appreciable distance and is inset from the front and rear edges thereof. Preferably, although not necessarily, it extends from end to end of the block. It may include a pair of alined relatively narrow portions 25 and 26 corresponding generally to the sides of the finished ring, and merging substantially centrally of the block into wider portions 27 corresponding generally to the signet area of the finished ring and transversely grooved or channeled as at 28. The walls of the groove may be varied as desired and the shape of the forcer generally will of course vary according to the shape, size, and weight of the ring being made.

The coacting die 22 (Figs. 3, 4 and 5) also consists of a block, the upper face 29 of which is centrally channeled as at 30 from end to end thereof and to a substantial depth and along lines which follow generally the lines of the forcing surface 24 of the forcer which snugly fits therein.

Specifically, the channeled portion 30 comprises relatively narrow end portions 31 and 32 merging into wider portions 33 substantially centrally of the die face 29. The bottom of the cut-out in the region of the central portions 33 is raised slightly as at 34 (Figs. 4 and 5). This raised portion rises gradually and symmetrically from the plane of the bottom of the channel and reaches its greatest height at the center, where it presents a transversely extending rib or fin 35 which is received within the transverse channel 28 of member 21 when the members 21 and 22 are brought together upon an interposed ring blank B.

The depth of the cut-out channel 30 may be varied as desired, and like the forcing face 24, the walls thereof may be flat or rounded on any desired arc or radius similarly with the raised portions 34, 35. These may vary from the flat to a radius or arc according to the ring being made.

The forcer fits the die snugly so as not to leave any excess stock which later has to be trimmed off the striking or ring as salvage. The blank B takes the shape of the die on one side and of the forcer on the other. This is illustrated in Figs. 7 and 8 wherein the striking or stamping which results when the members 21 and 22 are brought together on the interposed blank B is shown as squeezed and flattened and otherwise shaped to present the relatively narrow tapering shank portions 36 and the central widened head 37, the metal being crowded at the head in a substantially V-shaped portion 38 disposed below the plane of the tapering shank portions 36 and symmetrical thereto.

The next step in my method consists in transversely sawing into said V-shaped portion 38 from above, as indicated at 39 in Fig. 9. The depth of the saw cut 39 will be sufficient to make a signet or face or flat 40 (Figs. 10 and 11) of the wanted size and location when the shank portions 36 are bent to ring form and soldered together.

The signet base or top 41 (Fig. 11) may then be attached to the signet 40 in the usual manner.

In the method of Figs. 12 to 20, wherein I show a light weight and/or shell ring having a cut-out back, the V-shaped portion $38^1$ is transversely sawed from above as at $39^1$, leaving a hole or cut-out in the signet or face when the shank portions are bent to ring form.

The forcer 21' of Figs. 12 and 13 is of slightly different design from that of Figs. 1 and 2, having the symmetrical portions 42 (Fig. 13). With such forcer 21' I prefer to use a flat blank B' (Fig. 19) for this type of ring.

The die 22 of Figs. 3, 4 and 5 however is used with the forcer 21' of Figs. 12 and 13 and produces the striking of Figs. 14 and 15.

This consists of the tapered shank portions 36', the widened center portion 37', and the thickened V-shaped portion 38', this latter however having the spaced alined portions 38a on its under side (see Fig. 15).

The striking is slitted transversely from above as at 39' (Figs. 16 and 20) leaving the hole or opening 40a in the signet 40' when the shank portions 36' are bent to ring form (see Fig. 18).

With both types of ring, the principle of my method is the production of a properly shaped striking (Fig. 7 or 14) which when transversely sawed (Fig. 9 or 16) and the shank portions bent towards each other (Fig. 10 or 17) form in effect equal opposite arcs of a complete circle (see Fig. 21).

Various modifications in method, apparatus and materials may obviously be resorted to within the spirit and scope of my invention as defined by the appended claims.

What I therefore claim and desire to secure by Letters Patent is:—

1. The steps in the method of making a signet ring from a blank which has a widened and thickened center portion and relatively narrow end portions, which consists in transversely slitting said widened and thickened center portion, in bending said end portions towards each other in a direction to spread the sides of the slit into coplanar relationship, thus forming a flat top or signet, and in bringing the end portions into end abutting relationship to complete the ring.

2. The ring making method which consists in producing a striking having a wide center portion and narrow tapering end portions, in transversely slitting said center portion, in bending said end portions towards each other in a direction to spread the sides of the slit into coplanar relationship, thus forming a flat top or signet, and in bringing the end portions into end abutting relationship to complete the ring.

3. The method of making a ring of the signet type, which consists in pressing a ring blank into a striking having relatively narrow end portions and a widened and thickened center portion, in transversely slitting into said center portion from above to form a narrow slot extending from edge to edge of the blank and from one face of the blank inward a portion only of the depth of the blank, in bending said end portions towards each other in a direction to spread the sides of the slit into coplanar relationship, thus forming a flat top or signet, and in bringing the end portions into end abutting relationship to complete the ring.

4. The method of claim 3, the slit producing an included opening in the flat top or signet when the striking is bent to ring form.

5. A signet ring blank comprising a member having a transversely slitted wide center portion and relatively narrow end portions, the slit being a relatively narrow slot and extending from edge to edge of the blank and from one face of the blank inwardly a portion only of the depth of the blank.

6. A signet ring blank comprising a member having a transversely slitted widened and thickened center portion and tapering relatively narrow end portions, the slit being a relatively narrow slot and extending from edge to edge of the blank and from one face of the blank inwardly a portion only of the depth of the blank.

7. A signet ring blank consisting of a length of material having a widened and thickened center portion and relatively narrow end portions, said center portion having a relatively narrow slit extending from edge to edge of the blank and from one face of the blank inwardly a portion only of the depth of the blank, the sides of the slit being adapted to form a flat signet area when in coplanar relation, and the end portions being adapted to form an annulus when in end abutting relationship.

WILLIAM E. WOOD.